United States Patent
Sun et al.

(10) Patent No.: US 12,487,958 B2
(45) Date of Patent: Dec. 2, 2025

(54) PCIE DEVICE POSITIONING METHOD AND APPARATUS, AND RELATED DEVICE

(71) Applicant: SUZHOU METABRAIN INTELLIGENT TECHNOLOGY CO., LTD., Jiangsu (CN)

(72) Inventors: Yongbo Sun, Jiangsu (CN); Kaizhi Lin, Jiangsu (CN); Daotong Li, Jiangsu (CN); Binghui Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/572,142

(22) PCT Filed: Jun. 19, 2022

(86) PCT No.: PCT/CN2022/099649
§ 371 (c)(1),
(2) Date: Dec. 19, 2023

(87) PCT Pub. No.: WO2023/137963
PCT Pub. Date: Jul. 27, 2023

(65) Prior Publication Data
US 2024/0289294 A1    Aug. 29, 2024

(30) Foreign Application Priority Data
Jan. 18, 2022 (CN) .......................... 202210051743.6

(51) Int. Cl.
*G06F 13/14* (2006.01)
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 5,761,448 A * 6/1998 Adamson .............. G06F 13/423
710/312
2005/0071521 A1* 3/2005 Nordstrom .......... G06F 12/0653
710/9

(Continued)

FOREIGN PATENT DOCUMENTS

CN    103763129 A    4/2014
CN    106294222 A    1/2017

(Continued)

OTHER PUBLICATIONS

International Search Report issued for International Patent Application No. PCT/CN2022/099649 mailed Sep. 27, 2022, 9 pgs.

(Continued)

*Primary Examiner* — Henry Tsai
*Assistant Examiner* — Dean Phan
(74) *Attorney, Agent, or Firm* — Merchant & Gould P.C.

(57) ABSTRACT

A Peripheral Component Interconnect Express (PCIE) device positioning method and apparatus, and a related device are provided. The PCIE device positioning method includes: acquiring device information of a target PCIE device, and determining a physical slot number and PCIE bridge information of the target PCIE device according to the device information; generating first position matching information according to the physical slot number and the PCIE bridge information; determining, according to a first mapping relationship, position information corresponding to the first position matching information, where the first mapping relationship includes a mapping relationship between the first position matching information of each PCIE device and the position information of each PCIE (Continued)

device; and determining, according to the position information, a position where the target PCIE device is located.

18 Claims, 2 Drawing Sheets

(56) References Cited

U.S. PATENT DOCUMENTS

| | | | |
|---|---|---|---|
| 2008/0005372 A1* | 1/2008 | Bolen | G06F 9/4411 |
| | | | 710/8 |
| 2012/0311221 A1* | 12/2012 | Freking | G06F 13/4081 |
| | | | 710/313 |
| 2016/0378696 A1 | 12/2016 | Warkentin et al. | |
| 2018/0081849 A1* | 3/2018 | Remis | G06F 13/4022 |
| 2018/0276024 A1* | 9/2018 | He | G06F 9/45508 |

FOREIGN PATENT DOCUMENTS

| | | |
|---|---|---|
| CN | 109189602 A | 1/2019 |
| CN | 112463238 A | 3/2021 |
| CN | 112559425 A | 3/2021 |
| CN | 113886312 A | 1/2022 |
| CN | 114077452 A | 2/2022 |

OTHER PUBLICATIONS

Search Report issued for Chinese Patent Application No. 202210051743.6 dated Feb. 25, 2022, 2 pgs.

* cited by examiner

PCIE DEVICE POSITIONING METHOD AND APPARATUS, AND RELATED DEVICE

CROSS-REFERENCE TO RELATED APPLICATIONS

The present application is a National Stage Application of PCT International Application No.: PCT/CN2022/099649 filed on Jun. 19, 2022, which claims priority to Chinese Patent Application 202210051743.6, filed in the China National Intellectual Property Administration on Jan. 18, 2022, the disclosure of which is incorporated herein by reference in its entirety.

TECHNICAL FIELD

The present disclosure relates to the technical field of electronic devices, and in particular, to a Peripheral Component Interconnect Express (PCIE) device positioning method, and further to a PCIE device positioning apparatus, a PCIE device positioning device, and a computer-readable storage medium.

BACKGROUND

A Base Input/Output System (BIOS) and a Baseboard Management Controller (BMC) have the function of positioning faulty devices and recording logs, where the devices include PCIE devices. When enumerating and processing the PCIE devices, the BIOS allocates a set of information including a Bus, a Device, and a Function Number for each of the PCIE devices. The combination of the Bus information, the Device information, and the Function Number information is unique, and is able to be used for uniquely positioning a PCIE logic device.

However, for a machine that is provided with two or more layers of PCIE device adapter board cards, for example, provided with a switch adapter board at an upper layer and another switch adapter board at a lower layer, for ease of reuse and maintenance, the two layers of adapter boards generally use identical designs and forms, and are manufactured with material of the same material number, and therefore the adapter board at the upper layer does not need to be distinguished from the adapter board at the lower layer during use. On this basis, in order to achieve functions of identifying the property information of a PCIE device or positioning a faulty device, an attribute value of a physical slot number of the device needs to be used to find out a physical position where the PCIE device is located. To facilitate the positioning, the value of the physical slot number of each PCIE device is required to be unique, so as to avoid matching of a wrong character string for identifying the physical position of the device. However, the inventor realized that, on a switch board, the physical slot numbers of the PCIE devices that are connected to slots/sockets adapted via the switch board are often duplicated in pairs. In addition, when the devices are connected by using two or more layers of switch boards on a machine, the physical slot numbers of the PCIE devices at the corresponding positions on different layers of switch boards are also the same by default. The above fact causes difficult positioning of the PCIE device, greatly reducing the accuracy of a positioning result when positioning the PCIE device.

Therefore, how to effectively improve the accuracy when positioning a PCIE device is an urgent problem to be solved by a person skilled in the art.

SUMMARY

An aspect of the embodiments of the present disclosure provides a PCIE device positioning method. The method includes the following operations.

Device information of a target PCIE device is acquired, and a physical slot number and PCIE bridge information of the target PCIE device are determined according to the device information.

First position matching information is generated according to the physical slot number and the PCIE bridge information.

Position information corresponding to the first position matching information is determined according to a first mapping relationship. The first mapping relationship includes a mapping relationship between the first position matching information of each PCIE device and the position information of each PCIE device.

The position where the target PCIE device is located is determined according to the position information.

In one or more embodiments, the operation of acquiring the device information of the target PCIE device includes the following operation.

The device information of the target PCIE device is acquired according to a PCIE device running log.

In one or more embodiments, the device information includes a Bus number, a Device number, and a Function Number. The operation of determining the physical slot number and the PCIE bridge information of the target PCIE device according to the device information includes the following operations.

The physical slot number corresponding to the Bus number, the Device number, and the Function Number are determined according to a second mapping relationship. The second mapping relationship includes a mapping relationship between the Bus number, Device number and Function Number of each PCIE device, and the physical slot number of each PCIE device.

PCIE bridge source tracing is performed according to the Bus number by using a PCIE specification algorithm, so as to obtain the PCIE bridge information.

In one or more embodiments, when more than one piece of position information corresponding to the first position matching information is determined according to the first mapping relationship, the method further includes the following operations.

A Bus number of a root port corresponding to the target PCIE device is queried according to the Bus number by using the PCIE specification algorithm.

A Central Processing Unit (CPU) number of a target CPU to which the target PCIE device belongs is determined according to the Bus number of the root port.

Second position matching information is generated according to the CPU number, the Bus number of the root port, the physical slot number, and the PCIE bridge information.

Position information corresponding to the second position matching information is determined according to a third mapping relationship. The third mapping relationship includes a mapping relationship between the CPU number, Bus number of the root port, physical slot number and PCIE bridge information which correspond to each PCIE device, and the position information of each PCIE device.

The position where the target PCIE device is located is determined according to the position information.

In one or more embodiments, the operation of determining, according to the Bus number of the root port, the CPU number of the target CPU to which the target PCIE device belongs includes the following operation.

The CPU number corresponding to the Bus number of the root port is determined according to a fourth mapping relationship. The fourth mapping relationship includes a mapping relationship between the CPU number corresponding to each PCIE device and the Bus number of the root port corresponding to each PCIE device.

In one or more embodiments, the Bus number of the root port in the fourth mapping relationship is obtained by reading an Operating System (OS) instruction or a Base Input/Output System (BIOS) instruction.

In one or more embodiments, the PCIE device positioning method further includes the following operation.

The position where the target PCIE device is located is outputted.

Another aspect of the embodiments of the present disclosure further provides a PCIE device positioning apparatus. The method includes an information acquisition module, an information combination module, an information matching module, and a device positioning module.

The information acquisition module is configured to acquire device information of a target PCIE device, and determine a physical slot number and PCIE bridge information of the target PCIE device according to the device information.

The information combination module is configured to generate first position matching information according to the physical slot number and the PCIE bridge information.

The information matching module is configured to determine, according to a first mapping relationship, position information corresponding to the first position matching information. The first mapping relationship includes a mapping relationship between the first position matching information of each PCIE device and the position information of each PCIE device.

The device positioning module is configured to determine, according to the position information, a position where the target PCIE device is located.

Still another aspect of the embodiments of the present disclosure further provides a PCIE device positioning device. The device includes a memory, and one or more processors. The memory stores a computer-readable instruction, and the computer-readable instruction, when being executed by the one or more processors, causes the one or more processors to execute operations of any one of the PCIE device positioning methods described above.

Yet another aspect of the embodiments of the present disclosure further provides one or more non-volatile computer-readable storage media storing a computer-readable instruction. The computer-readable instruction, when being executed by one or more processors, causes the one or more processors to execute operations of any one of the PCIE device positioning methods described above.

The details of one or more embodiments of the present disclosure are set forth in the drawings and the description below. Other features and advantages of the present disclosure will be apparent from the specification, the drawings and the claims.

BRIEF DESCRIPTION OF THE DRAWINGS

To describe technical solutions in the related art and embodiments of the present disclosure clearly, the drawings that need to be used in the description of the related art and the embodiments of the present disclosure are briefly introduced. It is apparent that the following description of the drawings related to the embodiments of the present disclosure is merely a part of the embodiments in the present disclosure. For those having ordinary skill in the art, other drawings may be obtained according to the drawings provided without creative efforts, and the other drawings obtained also fall within the scope of protection of the present disclosure.

DETAILED DESCRIPTION

The embodiments of the present disclosure provide a PCIE device positioning method. The PCIE device positioning method may effectively improve the accuracy when positioning a PCIE device. Some other embodiments of the present disclosure provide a PCIE device positioning apparatus, a PCIE device positioning device, and a computer-readable storage medium, which also have the above beneficial effect.

In order to describe the technical solutions in the embodiments of the present disclosure more clearly and more completely, the technical solutions in the embodiments of the present disclosure are described below with reference to the drawings in the embodiments of the present disclosure. It is apparent that the described embodiments are only part of the embodiments of the present disclosure, not all the embodiments. All other embodiments obtained by those having ordinary skill in the art based on the embodiments in the present disclosure without creative efforts all fall within the scope of protection of the present disclosure.

One or more embodiments of the present disclosure provide a PCIE device positioning method.

Figure 1:
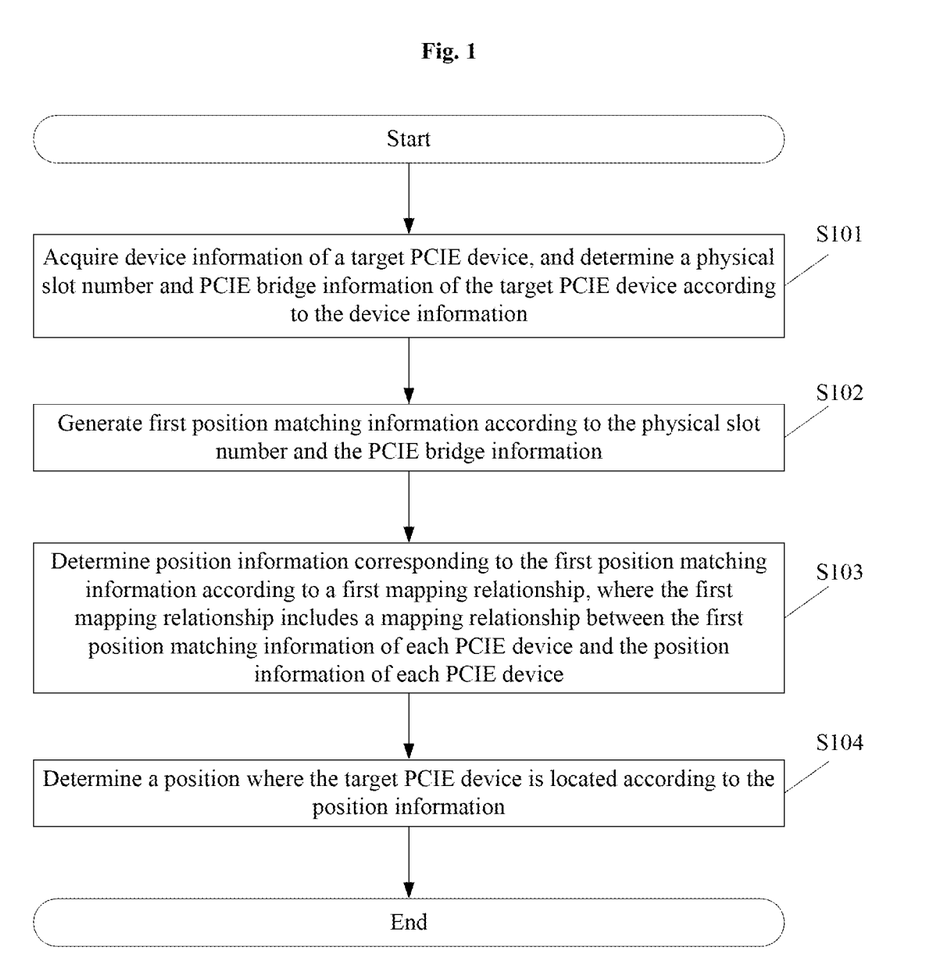
FIG. 1 is a schematic flowchart of a PCIE device positioning method according to one or more embodiments.

Referring to FIG. 1, FIG. 1 is a schematic flowchart of the PCIE device positioning method provided in one or more embodiments of the present disclosure. The PCIE device positioning method may include the following operations S101 to S104.

At S101, device information of a target PCIE device is acquired, and a physical slot number and PCIE bridge information of the target PCIE device are determined according to the device information.

This operation is performed to acquire the device information of the target PCIE device, and then acquire the physical slot number and the PCIE bridge information of the target PCIE device based on the device information. The target PCIE device is a PCIE device that needs to be positioned. The device information is basic information of the target PCIE device, for example, the Bus, the Device, and the Function Number, which are described above. The device information may further include basic device information of other types. The specific content of the device information may be set by those having ordinary skill in the art according to actual situations, and is not limited in the present disclosure. Further, the physical slot number and the PCIE bridge information are acquired based on the device information of the target PCIE device. The PCIE bridge information refers to relevant information of PCIE bridges at all levels between the target PCIE device and a PCIE root port of a CPU, and includes, but is not limited to, the Bus, the Device, the Function Number, etc.

At S102, first position matching information is generated according to the physical slot number and the PCIE bridge information.

This operation is performed to acquire the first position matching information. The first position matching information is used for achieving matching of position information (the specific details for matching of the position information based on the first position matching information may refer to S103), so as to determine position information of the target PCIE device. In some exemplary implementations, the first position matching information may be generated according to the physical slot number and the PCIE bridge information. The generation process may be implemented by splicing character strings. It is apparent that the splicing sequence of the character strings does not affect the implementation of the technical solution, and is not limited in the embodiments of the present disclosure. Based on this, since the uniqueness of the first position matching information may be effectively guaranteed after the character strings are spliced, the unique position information may be obtained through matching, so as to guarantee the accuracy when positioning the PCIE device.

At S103, position information corresponding to the first position matching information is determined according to a first mapping relationship. The first mapping relationship includes a mapping relationship between the first position matching information of each PCIE device and the position information of each PCIE device.

This operation is performed to achieve matching of the first position matching information, so as to obtain the position information corresponding to the first position matching information. The position information is used for indicating a specific position of the target PCIE device. In some exemplary implementations, a mapping relationship, which is the first mapping relationship, between the position matching information and the position information is pre-established for each PCIE device in a system. Therefore, the position information corresponding to the first position matching information may be obtained through matching based on the first mapping relationship after the first position matching information is generated based on S102.

At S104, the position where the target PCIE device is located is determined according to the position information.

This operation is performed to determine the position of the target PCIE device. After the position information corresponding to the first position matching information is obtained through matching based on the first mapping relationship, the position where the target PCIE device is located may be determined according to the position information. The position information in the first mapping relationship may be in the form of a position information character string. Further, a physical position, for example, a silk screen of a slot or position where the target PCIE device is located, corresponding to the position information character string may also be obtained by information matching (for example, based on a mapping relationship between the position information character string and the physical position). Therefore, the accurate positioning of the PCIE device is realized.

Through the above operations, according to the PCIE device positioning method provided in the embodiments of the present disclosure, the mapping relationship, which is the first mapping relationship, between the position matching information and the position information is pre-established for each PCIE device in the system, such that the physical slot number and the PCIE bridge information of the target PCIE device may be determined in advance according to the device information after the device information of the target PCIE device (which is the PCIE device to be positioned) is obtained, and then the unique position matching information is generated according to the physical slot number and the PCIE bridge information. Therefore, the position information corresponding to the position matching information may be determined by querying the first mapping relationship, so as to position the target PCIE device. The positioning of the PCIE device is performed based on the combination of the physical slot number and the PCIE bridge information. Since the position matching information, which is generated based on the physical slot number and the PCIE bridge information, is unique, the accurate positioning of the PCIE device may be realized through the implementation.

In an embodiment of the present disclosure, the operation of acquiring the device information of the target PCIE device may include acquiring the device information of the target PCIE device according to a PCIE device running log.

The embodiment of the present disclosure provides a method for acquiring the device information of the target PCIE device. The device information may be obtained from the PCIE device running log. In an implementation scenario for positioning the PCIE device, when it is found that there is an abnormal PCIE device in the system, the position of the abnormal PCIE device may be determined by using the above PCIE device positioning method. If it is found that there is an abnormal PCIE device in the system, the abnormal PCIE device may be determined based on the PCIE device running log. Therefore, the device information of the target PCIE device may be acquired according to the PCIE device running log.

In an embodiment of the present disclosure, the device information may include a Bus number, a Device number, and a Function Number. The operation of determining the physical slot number and the PCIE bridge information of the target PCIE device according to the device information may include: determining, according to a second mapping relationship, the physical slot number corresponding to the Bus number, the Device number, and the Function Number, where the second mapping relationship includes a mapping relationship between the Bus number, Device number and Function Number of each PCIE device, and the physical slot number of each PCIE device; and performing PCIE bridge source tracing according to the Bus number by using a PCIE specification algorithm, so as to obtain the PCIE bridge information.

The embodiment of the present disclosure provides a specific type of basic device information, and an implementation method for determining the physical slot number and the PCIE bridge information based on this specific type of basic device information. First, the device information of the target PCIE device may include a Bus number, a Device number, and a Function Number, which are the Bus, the Device, and the Function Number as mentioned above. Further, the physical slot number of the target PCIE device may be determined based on the Bus number, the Device number, and the Function Number, and the PCIE bridge information of the target PCIE device may be determined based on the Bus number. The determination of the physical slot number of the target PCIE device based on the Bus number, the Device number, and the Function Number may be implemented based on the second mapping relationship. The second mapping relationship includes a mapping relationship between the Bus number, Device number and Function Number of each PCIE device in the system, and the physical slot number of each PCIE device in the system. On this basis, the physical slot number may be determined by means of information matching. The determination of the PCIE bridge information of the target PCIE device based on the Bus number may be implemented through a PCIE specification algorithm. For example, the PCIE specification algorithm is used to perform source tracing starting from the Bus number of the target PCIE device, until a PCIE root port of the CPU is finally obtained by level-by-level tracing, so as to obtain relevant information of PCIE bridges at all levels between the target PCIE device and the PCIE root port of the CPU.

In an embodiment of the present disclosure, when more than one piece of position information corresponding to the first position matching information is determined according to the first mapping relationship, the method may further include: querying, according to the Bus number by using the PCIE specification algorithm, a Bus number of a root port corresponding to the target PCIE device; determining, according to the Bus number of the root port, a CPU number of a target CPU to which the target PCIE device belongs; generating second position matching information according to the CPU number, the Bus number of the root port, the physical slot number, and the PCIE bridge information; determining, according to a third mapping relationship, position information corresponding to the second position matching information, where the third mapping relationship includes a mapping relationship between the CPU number, Bus number of the root port, physical slot number and PCIE bridge information which correspond to each PCIE device, and the position information of each PCIE device; and determining, according to the position information, the position where the target PCIE device is located.

It may be understood that, there may be a plurality of layers of PCIE device adapter board cards in the system, only the position of the target PCIE device on the PCIE device adapter board cards can be determined based on the physical slot number and the PCIE bridge information, but it is not possible to determine exactly which PCIE device adapter board card the target PCIE device is on, resulting in inaccurate positioning of the PCIE device. Therefore, in order to solve the technical problem, the unique second position matching information may be established based on the CPU number and the physical slot number, so as to achieve the accurate positioning of the target PCIE device.

In some exemplary implementations, when more than one piece of position information corresponding to the first position matching information is determined according to the first mapping relationship, it indicates that there are two or more PCIE device adapter board cards in the system. In this case, the target PCIE device may be positioned further based on the CPU number and the Bus number of the root port. During implementation, the PCIE specification algorithm is used to perform source tracing starting from the Bus number of the target PCIE device, until the Bus number of the root port corresponding to the target PCIE device is obtained by tracing, and then the CPU number of the target CPU to which the target PCIE device belongs is determined according to the Bus number of the root port. Next, the second position matching information is generated according to the CPU number, the Bus number of the root port, the physical slot number, and the PCIE bridge information, and the process of generating the second position matching information may refer to the process of generating the first position matching information, and details are not repeated in the embodiment of the present disclosure. Further, the position information corresponding to the second position matching information is obtained through matching based on the third mapping relationship, and there should be only one piece of position information obtained by the matching based on the third mapping relationship. The third mapping relationship includes a mapping relationship between the CPU number, Bus number of the root port, physical slot number and PCIE bridge information which correspond to each PCIE device in the system, and the position information of each PCIE device in the system. Likewise, the process of creating the third mapping relationship is similar to the process of creating the first mapping relationship, and details are not repeated in the embodiment of the present disclosure. Finally, after the position information is determined, the position where the target PCIE device is located may be determined according to the position information, such that the accurate positioning of the target PCIE device is realized.

In an embodiment of the present disclosure, the operation of determining, according to the Bus number of the root port, the CPU number of the target CPU to which the target PCIE device belongs may include determining, according to a fourth mapping relationship, the CPU number corresponding to the Bus number of the root port. The fourth mapping relationship includes a mapping relationship between the CPU number corresponding to each PCIE device and the Bus number of the root port corresponding to each PCIE device.

The embodiment of the present disclosure provides an implementation method for determining, according to the Bus number of the root port, the CPU number of the CPU to which the target PCIE device belongs. The process may also be based on a pre-created mapping relationship, that is, may be implemented based on the fourth mapping relationship. In some exemplary implementations, the Bus number of each root port and the CPU number of each CPU in the system may be collected in advance, such that the mapping relationship, which is the fourth mapping relationship, between the CPU number corresponding to each PCIE device and the Bus number of the root port corresponding to each PCIE device may be created. Based on this, after the corresponding Bus number of the root port is obtained by querying the Bus number of the target PCIE device, the CPU number corresponding to the Bus number of the root port may be obtained through matching based on the fourth mapping relationship.

In an embodiment of the present disclosure, the Bus number of the root port in the fourth mapping relationship may be obtained by reading an OS instruction or a BIOS instruction.

The embodiment of the present disclosure provides a method for acquiring the Bus number of each root port in the fourth mapping relationship, that is, the Bus number may be obtained by reading the OS instruction or the BIOS instruction. It may be understood that the Bus number may also be obtained by related reading software or reading of various specification definitions. A specific implementation may be set by those having ordinary skill in the art according to actual situations, and is not limited in the embodiments of the present disclosure.

In an embodiment of the present disclosure, the PCIE device positioning method may further include an operation of outputting the position where the target PCIE device is located.

The PCIE device positioning method provided in the embodiments of the present disclosure is performed to output the position of the target PCIE device. In some exemplary implementations, the position may be outputted after the position where the target PCIE device is located is determined based on the position information. In addition, in order to further guarantee the integrity of output information, other types of data information of the target PCIE device may also be outputted at the same time, for example, the basic device information, the physical slot number, the PCIE bridge information, the CPU number of the CPU, the position matching information, and the position information.

Figure 2:
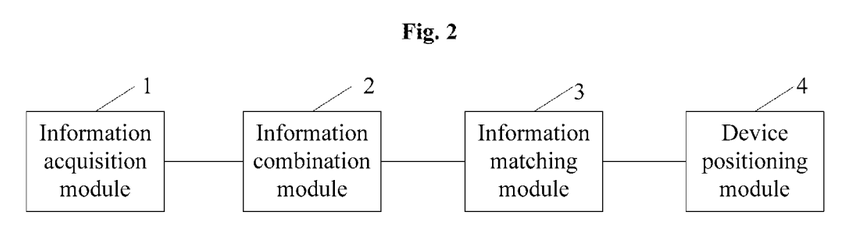
FIG. 2 is a schematic structural diagram of a PCIE device positioning apparatus according to one or more embodiments.

An embodiment of the present disclosure provides a PCIE device positioning apparatus. Referring to FIG. 2, FIG. 2 is a schematic structural diagram of the PCIE device positioning apparatus provided in one or more embodiments of the present disclosure. The PCIE device positioning apparatus may include an information acquisition module, an information combination module, an information matching module, and a device positioning module.

The information acquisition module 1 is configured to acquire device information of a target PCIE device, and determine a physical slot number and PCIE bridge information of the target PCIE device according to the device information.

The information combination module 2 is configured to generate first position matching information according to the physical slot number and the PCIE bridge information.

The information matching module 3 is configured to determine, according to a first mapping relationship, position information corresponding to the first position matching information. The first mapping relationship includes a mapping relationship between the first position matching information of each PCIE device and the position information of each PCIE device.

The device positioning module 4 is configured to determine, according to the position information, a position where the target PCIE device is located.

It may be seen that, according to the PCIE device positioning apparatus provided in this embodiment of the present disclosure, the mapping relationship, which is the first mapping relationship, between the position matching information and the position information is pre-established for each PCIE device in the system, such that the physical slot number and the PCIE bridge information of the target PCIE device may be determined in advance according to the device information after the device information of the target PCIE device (which is the PCIE device to be positioned) is obtained, and then the unique position matching information is generated according to the physical slot number and the PCIE bridge information. Therefore, the position information corresponding to the position matching information may be determined by querying the first mapping relationship, so as to position the target PCIE device. The positioning of the PCIE device is performed based on the combination of the physical slot number and the PCIE bridge information. Since the position matching information, which is generated based on the physical slot number and the PCIE bridge information, is unique, the accurate positioning of the PCIE device may be realized through the implementation.

In an embodiment of the present disclosure, the information acquisition module 1 may be configured to acquire the device information of the target PCIE device according to a PCIE device running log.

In an embodiment of the present disclosure, the device information may include a Bus number, a Device number, and a Function Number. The information acquisition module 1 may be configured to determine, according to a second mapping relationship, the physical slot number corresponding to the Bus number, the Device number, and the Function Number, where the second mapping relationship includes a mapping relationship between the Bus number, Device number and Function Number of each PCIE device, and the physical slot number of each PCIE device; and perform PCIE bridge source tracing according to the Bus number by using a PCIE specification algorithm, so as to obtain the PCIE bridge information.

In an embodiment of the present disclosure, when more than one piece of position information corresponding to the first position matching information is determined according to the first mapping relationship, the apparatus may further include an accurate positioning module, which is configured to: query, according to the Bus number by using the PCIE specification algorithm, a Bus number of a root port corresponding to the target PCIE device; determine, according to the Bus number of the root port, a CPU number of a target CPU to which the target PCIE device belongs; generate second position matching information according to the CPU number, the Bus number of the root port, the physical slot number, and the PCIE bridge information; determine, according to a third mapping relationship, position information corresponding to the second position matching information, where the third mapping relationship includes a mapping relationship between the CPU number, Bus number of the root port, physical slot number and PCIE bridge information which correspond to each PCIE device, and the position information of each PCIE device; and determine, according to the position information, the position where the target PCIE device is located.

In an embodiment of the present disclosure, the accurate positioning module based on the CPU number may be configured to determine, according to a fourth mapping relationship, the CPU number corresponding to the Bus number of the root port. The fourth mapping relationship includes a mapping relationship between the CPU number corresponding to each PCIE device and the Bus number of the root port corresponding to each PCIE device.

In an embodiment of the present disclosure, the Bus number of the root port in the fourth mapping relationship may be obtained by reading an OS instruction or a BIOS instruction.

In an embodiment of the present disclosure, the PCIE device positioning apparatus may further include a position output module, which is configured to output the position where the target PCIE device is located.

The introduction of the apparatus provided in the embodiment of the present disclosure refers to the above method embodiments, and details are not repeated in the current embodiment of the present disclosure.

Figure 3:
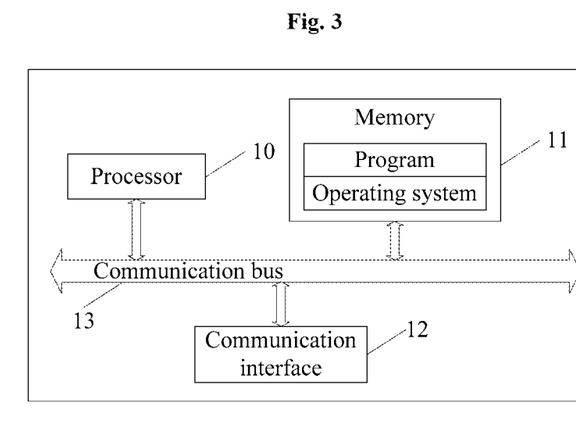
FIG. 3 is a schematic structural diagram of a PCIE device positioning device according to one or more embodiments.

An embodiment of the present disclosure provides a PCIE device positioning device. Referring to FIG. 3, FIG. 3 is a schematic structural diagram of the PCIE device positioning device provided in one or more embodiments of the present disclosure. The PCIE device positioning device may include a memory and one or more processors.

The memory is configured to store a computer-readable instruction.

The one or more processors are configured to implement operations of any one of the PCIE device positioning methods when executing the computer-readable instruction.

FIG. 3 is a schematic diagram of a composition structure of the PCIE device positioning device. The PCIE device positioning device may include a processor 10, a memory 11, a communication interface 12, and a communication bus 13. The processor 10, the memory 11, and the communication interface 12 all communicate with each other via the communication bus 13.

In this embodiment of the present disclosure, the processor 10 may be a CPU, an application specific integrated circuit, a digital signal processor, a field programmable gate array, or other programmable logic devices.

The processor 10 may call a computer-readable instruction stored in the memory 11. In some exemplary implementations, the processor 10 may execute operations in the embodiments of the PCIE device positioning method.

The memory 11 is configured to store one or more computer-readable instructions. The computer-readable instruction may include a program code. The program code includes a computer operation instruction. In this embodiment of the present disclosure, the memory 11 at least stores the computer-readable instruction for implementing the following functions.

Device information of a target PCIE device is acquired, and a physical slot number and PCIE bridge information of the target PCIE device are determined according to the device information.

First position matching information is generated according to the physical slot number and the PCIE bridge information.

Position information corresponding to the first position matching information is determined according to a first mapping relationship. The first mapping relationship includes a mapping relationship between the first position matching information of each PCIE device and the position information of each PCIE device.

The position where the target PCIE device is located is determined according to the position information.

In an exemplary implementation, the memory 11 may include a program storage area region and a data storage area. The program storage area may store an operating system, and an application program required for at least one function. The data storage area may store data created during operation.

In addition, the memory 11 may include a high-speed random access memory, and may further include a non-volatile memory, for example, at least one disk memory device or other volatile solid state memory devices.

The communication interface 12 may be an interface of a communication module, and is configured to be connected to other devices or systems.

It is to be noted that, the structure shown in FIG. 3 does not constitute a limitation of the PCIE device positioning device in the embodiments of the present disclosure, and in practice the PCIE device positioning device may include more or fewer components than those shown in FIG. 3, or a combination of certain components.

An embodiment of the present disclosure further provides a non-volatile computer-readable storage medium. The non-volatile computer-readable storage medium stores a computer-readable instruction, and when the computer-readable instruction is executed by one or more processors, operations of any one of the PCIE device positioning methods may be implemented.

The computer-readable storage medium may include: various media capable of storing program codes such as a U disk, a mobile Hard Disk Drive (HDD), a Read-Only Memory (ROM), a Random Access Memory (RAM), a magnetic disk or an optical disk.

The introduction of the computer-readable storage medium provided in the embodiments of the present disclosure refers to the above method embodiments, and details are not repeated in the current embodiment of the present disclosure.

Each embodiment in this specification is described in a progressive manner, and each embodiment focuses on the differences from other embodiments, and the same or similar parts of each embodiment may be referred to each other. For the apparatus disclosed in the embodiments, since the apparatus corresponds to the method disclosed in the embodiments, the description is relatively simple, and for related parts, refer to the partial descriptions of the method.

Those having ordinary skill in the art may further realize that the units and algorithmic operations of the various examples described in combination with the embodiments disclosed herein are capable of being implemented in electronic hardware, computer software, or a combination of electronic hardware and computer software. In order to clearly illustrate the interchangeability of hardware and software, the composition and the operations of the examples have been described in the above description in general terms according to functions. Whether these functions are executed in a hardware or software manner depends on specific applications and design constraints of the technical solutions. Those having ordinary skill in the art may realize the described functions for each specific application by use of different methods, but such implementation shall fall within the scope of this application.

The operations of the method or algorithm described in combination with the embodiments disclosed herein may be implemented directly with the hardware, a software module executed by the processor, or a combination of the hardware and the software module. The software module may be provided in the RAM, the memory, the ROM, the electrically programmable ROM, the electrically erasable programmable ROM, the register, the hard disk, a removable disk, a CD-ROM, or any other form of storage media known in the technical field.

The technical solutions provided in the embodiments of the present disclosure are introduced in detail above. Detailed examples are used in this specification to describe the principles and implementations of the present disclosure. The description of the above examples is merely used to facilitate understanding of the core idea of the present disclosure. It should be noted that for a person having ordinary skill in the art, without departing from the principles of the present disclosure, several improvements and modifications may be made to the present disclosure, which also fall within the scope of protection of the present disclosure.

What is claimed is:

1. A Peripheral Component Interconnect Express (PCIE) device positioning method, comprising:
   acquiring device information of a target PCIE device, and determining a physical slot number and PCIE bridge information of the target PCIE device according to the device information;
   generating first position matching information according to the physical slot number and the PCIE bridge information;
   determining, according to a first mapping relationship, position information corresponding to the first position matching information, wherein the first mapping relationship comprises a mapping relationship between the first position matching information of each PCIE device and the position information of each PCIE device; and
   determining, according to the position information, a position where the target PCIE device is located;
   wherein the device information comprises a Bus number, a Device number, and a Function Number; and determining the physical slot number and the PCIE bridge information of the target PCIE device according to the device information comprises:

determining, according to a second mapping relationship, the physical slot number corresponding to the Bus number, the Device number, and the Function Number, wherein the second mapping relationship comprises a mapping relationship between the Bus number, Device number and Function Number of each PCIE device, and the physical slot number of each PCIE device; and performing PCIE bridge source tracing according to the Bus number by using a PCIE specification algorithm, so as to obtain the PCIE bridge information.

2. The PCIE device positioning method according to claim 1, wherein acquiring the device information of the target PCIE device comprises:

acquiring the device information of the target PCIE device according to a PCIE device running log.

3. The PCIE device positioning method according to claim 1, wherein when more than one piece of position information corresponding to the first position matching information is determined according to the first mapping relationship, the method further comprises:

querying, according to the Bus number by using the PCIE specification algorithm, a Bus number of a root port corresponding to the target PCIE device;

determining, according to the Bus number of the root port, a Central Processing Unit (CPU) number of a target CPU to which the target PCIE device belongs;

generating second position matching information according to the CPU number, the Bus number of the root port, the physical slot number, and the PCIE bridge information;

determining, according to a third mapping relationship, position information corresponding to the second position matching information, wherein the third mapping relationship comprises a mapping relationship between the CPU number, Bus number of the root port, physical slot number and PCIE bridge information which correspond to each PCIE device, and the position information of each PCIE device; and determining, according to the position information, the position where the target PCIE device is located.

4. The PCIE device positioning method according to claim 3, wherein determining, according to the Bus number of the root port, the CPU number of the target CPU to which the target PCIE device belongs comprises:

determining, according to a fourth mapping relationship, the CPU number corresponding to the Bus number of the root port, wherein the fourth mapping relationship comprises a mapping relationship between the CPU number corresponding to each PCIE device and the Bus number of the root port corresponding to each PCIE device.

5. The PCIE device positioning method according to claim 4, wherein the Bus number of the root port in the fourth mapping relationship is obtained by reading an Operating System (OS) instruction or a Base Input/Output System (BIOS) instruction.

6. The PCIE device positioning method according to claim 1, further comprising:

outputting the position where the target PCIE device is located.

7. The PCIE device positioning method according to claim 1, wherein the PCIE bridge information refers to relevant information of PCIE bridges at all levels between the target PCIE device and a PCIE root port of a CPU.

8. The PCIE device positioning method according to claim 1, wherein the position information in the first mapping relationship is in a form of a position information character string.

9. The PCIE device positioning method according to claim 8, wherein determining, according to the position information, the position where the target PCIE device is located comprises:

determining, according to a fifth mapping relationship, a physical position corresponding to the position information character string, wherein the fifth mapping relationship is a mapping relationship between the position information character string and the physical position, and the physical position is a silk screen of a slot or position where the target PCIE device is located.

10. The PCIE device positioning method according to claim 1, wherein generating the first position matching information according to the physical slot number and the PCIE bridge information comprises:

generating the first position matching information by splicing a character string representing the physical slot number and a character string representing the PCIE bridge information.

11. The PCIE device positioning method according to claim 1, wherein the target PCIE device is an abnormal PCIE device in a system, and the PCIE device positioning method is performed to determine the position of the abnormal PCIE device when it is found that there is the abnormal PCIE device in the system.

12. The PCIE device positioning method according to claim 1, wherein performing the PCIE bridge source tracing according to the Bus number by using the PCIE specification algorithm, so as to obtain the PCIE bridge information comprises:

performing, by using the PCIE specification algorithm, source tracing starting from the Bus number of the target PCIE device, until a PCIE root port of the CPU is finally obtained by level-by-level tracing, so as to obtain the PCIE bridge information, wherein the PCIE bridge information refers to relevant information of PCIE bridges at all levels between the target PCIE device and the PCIE root port of the CPU.

13. The PCIE device positioning method according to claim 3, wherein querying, according to the Bus number by using the PCIE specification algorithm, the Bus number of the root port corresponding to the target PCIE device comprises:

performing, by using the PCIE specification algorithm, source tracing starting from the Bus number of the target PCIE device, until the Bus number of the root port corresponding to the target PCIE device is obtained by tracing.

14. The PCIE device positioning method according to claim 3, wherein generating the second position matching information according to the CPU number, the Bus number of the root port, the physical slot number, and the PCIE bridge information comprises:

generating second position matching information by splicing a character string representing the CPU number, a character string representing the Bus number of the root port, a character string representing the physical slot number, and a character string representing the PCIE bridge information.

15. The PCIE device positioning method according to claim 1, further comprising:

outputting one or more of the device information, the physical slot number, the PCIE bridge information, a CPU number of a CPU, the first position matching information, and the position information.

16. A Peripheral Component Interconnect Express (PCIE) device positioning device, comprising a memory, and one or more processors, wherein the memory stores a computer-readable instruction, and the computer-readable instruction, when being executed by the one or more processors, causes the one or more processors to execute following operations:

acquiring device information of a target PCIE device, and determining a physical slot number and PCIE bridge information of the target PCIE device according to the device information;

generating first position matching information according to the physical slot number and the PCIE bridge information;

determining, according to a first mapping relationship, position information corresponding to the first position matching information, wherein the first mapping relationship comprises a mapping relationship between the first position matching information of each PCIE device and the position information of each PCIE device; and determining, according to the position information, a position where the target PCIE device is located;

wherein the device information comprises a Bus number, a Device number, and a Function Number; and determining the physical slot number and the PCIE bridge information of the target PCIE device according to the device information comprises:

determining, according to a second mapping relationship, the physical slot number corresponding to the Bus number, the Device number, and the Function Number, wherein the second mapping relationship comprises a mapping relationship between the Bus number, Device number and Function Number of each PCIE device, and the physical slot number of each PCIE device; and performing PCIE bridge source tracing according to the Bus number by using a PCIE specification algorithm, so as to obtain the PCIE bridge information.

17. The PCIE device positioning device according to claim 16, wherein when more than one piece of position information corresponding to the first position matching information is determined according to the first mapping relationship, the computer-readable instruction further causes the one or more processors to execute following operations:

querying, according to the Bus number by using the PCIE specification algorithm, a Bus number of a root port corresponding to the target PCIE device;

determining, according to the Bus number of the root port, a Central Processing Unit (CPU) number of a target CPU to which the target PCIE device belongs;

generating second position matching information according to the CPU number, the Bus number of the root port, the physical slot number, and the PCIE bridge information;

determining, according to a third mapping relationship, position information corresponding to the second position matching information, wherein the third mapping relationship comprises a mapping relationship between the CPU number, Bus number of the root port, physical slot number and PCIE bridge information which correspond to each PCIE device, and the position information of each PCIE device; and determining, according to the position information, the position where the target PCIE device is located.

18. One or more non-volatile computer-readable storage media, storing a computer-readable instruction, wherein the computer-readable instruction, when being executed by one or more processors, causes the one or more processors to execute following operations:

acquiring device information of a target Peripheral Component Interconnect Express (PCIE) device, and determining a physical slot number and PCIE bridge information of the target PCIE device according to the device information;

generating first position matching information according to the physical slot number and the PCIE bridge information;

determining, according to a first mapping relationship, position information corresponding to the first position matching information, wherein the first mapping relationship comprises a mapping relationship between the first position matching information of each PCIE device and the position information of each PCIE device; and determining, according to the position information, a position where the target PCIE device is located;

wherein the device information comprises a Bus number, a Device number, and a Function Number; and determining the physical slot number and the PCIE bridge information of the target PCIE device according to the device information comprises:

determining, according to a second mapping relationship, the physical slot number corresponding to the Bus number, the Device number, and the Function Number, wherein the second mapping relationship comprises a mapping relationship between the Bus number, Device number and Function Number of each PCIE device, and the physical slot number of each PCIE device; and performing PCIE bridge source tracing according to the Bus number by using a PCIE specification algorithm, so as to obtain the PCIE bridge information.

* * * * *